United States Patent Office 3,502,718
Patented Mar. 24, 1970

3,502,718
PROCESS INVOLVING OXIDATION
Lester M. Welch, Seabrook, Tex., assignor to Petro-Tex Chemical Corporation, Houston, Tex., a corporation of Delaware
No Drawing. Filed Feb. 23, 1967, Ser. No. 617,825
Int. Cl. C07c 63/02, 3/00, 63/04
U.S. Cl. 260—524                    11 Claims

ABSTRACT OF THE DISCLOSURE

A process for the oxidation of mononuclear aromatic compounds having at least one methyl or aldehyde nuclear substituent in the presence of oxygen, cobaltous or cobaltic ions, and niobium ion, at 60° C. to 150° C., and at atmospheric pressure or greater.

Background of the invention

This invention relates to an improved method for the oxidation of aromatic compounds characterized by a single arly group having at least one methyl nuclear substituent. More particularly, the invention relates to an improved process for the efficient and economical conversion of suitable methyl and dimethyl substituted monoaryl compounds to aromatic monobasic and dibasic acids.

Previous studies in this field have evolved a variety of proposed processes for the catalytic liquid phase oxidation of alkylated aromatic compounds in the presence or absence of a solvent by means of air or oxygen using various metals or salts thereof as catalysts. A variety of organic compounds, such as peroxides, aldehydes, and ketones have been proposed and utilized as reaction initiators or activators.

French Patent 1,392,284 discloses the use of metals having a valence greater than one and a single valence state as effective co-catalysts with cobaltous or cobaltic ions for the conversion of specified aromatic compounds to aromatic carboxylic acids. Yields reported in the patent without the use of additional catalytic agents are said to be from 45 percent to 70.8 percent desired product.

The present invention has for its principal object the provision of a novel process for the economical and efficient conversion of aromatic compounds to useful oxidation products such as toluic acid, terephthalic acid, and various other compounds. A further object is to provide a method whereby methyl and dimethyl substituted benzenes may be directly oxidized to the desired products without the necessity of going through intermediate steps. Additional objects include the provision of such a process which yields directly products of high purity or having a small content of readily separable impurities, and which involves reaction conditions that are operable at low cost and readily controlled.

The above and other objects are accomplished in accordance with this invention by carrying out the reaction with the materials and the operating conditions hereinafter described.

Summary of the invention

Broadly, the invention comprises reacting a monoaryl compound having one or two methyl or aldehyde substituents in a monocarboxylic acid selected from the group consisting of aliphatic acids having 2 to 6 carbon atoms and aryl aliphatic acids having 8 to 12 carbon atoms, at a concentration of 0.3 to 2 molar, with oxygen at a temperature of from 60° C. to 150° C. at atmospheric pressure or greater, and in the presence of from 0.3 to 24 grams per liter cobaltous or cobaltic ion, or mixtures thereof, and 0.05 to 9.5 grams per liter of niobium catalyst, as more particularly hereinafter described. Typical starting materials are methyl or dimethyl substituted benzenes such as toluene, m-xylene, p-xylene, or mixtures containing such compounds. The aromatic starting material may contain, in addition to a methyl group or groups, other nuclear substituents inert to the oxidation reaction, such as chlorine, bromine, fluorine, nitro, carboxyl, alkoxy, aryloxy, or tertiary alkyl groups. Typical conversions include toluene to benzoic acid, m-xylene or m-toluic acid to isophthalic acid, p-xylene or p-toluic acid to terephthalic acid, 1,4-dimethyl-2-chlorobenzene to chloroterephthalic acid, and 1,4-dimethyl-2-nitrobenzene to nitroterephthalic acid. Additional conversions attainable by the present invention include conversion of terephthaldehyde and p-tolualdehyde to terephthalic acid, isophthalic aldehyde to isothalic acid, and benzaldehyde to benzoic acid.

Preferred embodiments

As noted above, either cobaltous or cobaltic ion (or both) must be present in amount corresponding to the initial provision of a cobalt salt soluble in the above solution, such as cobaltous acetate, propionate, or butyrate, to the extent of about 0.3 to 24 grams of cobaltous or cobaltic ions per liter of solution, although an amount of from about 0.4 to 15 grams is preferred. Thus, with the use of a 1 molar solution of the starting aromatic compound in acetic acid, the desired cobalt concentration may be supplied by the initial provision of about 0.03 to 0.20 mole of cobaltous acetate per liter of solution. Examples of cobaltous compounds which may be utilized are $Co(OAC)_2 \cdot 4H_2O$, cobaltous chloride, cobaltous acetylacetonate, etc., while cobaltic compounds are exemplified by cobaltic acetylacetonate and cobaltic acetate.

A small amount of water is preferred in the system, e.g., 0.001 to 0.02 mole per liter of the monocarboxylic acid media, more particularly hereinafter described, in order to reduce the induction period and to insure complete solubility of the cobalt compound. Water need not be used with the acetylacetonates. The water may be introduced directly or by use of hydrated materials.

Suitable temperatures for the oxidation process in accordance with this invention are within the range of 60° C. to about 130° C. at atmospheric pressure, although temperatures up to about 150° C. may at times be used, with somewhat higher pressures up to about 50 atmospheres. The preferred operating temperatures are within the range of 70° C. to 100° C.

While air is the most economical source of oxygen, any suitable oxygen-containing gas such as pure oxygen, ozone, or mixtures of such gases with inert gaseous diluents may be employed. It will, of course, be understood that in oxidizing substituted aromatic compounds in accordance with the invention, the oxygen supplied by continuous introduction of air or other oxygen-containing gas, as explained above, is the fundamental source of oxygen for the oxidation reaction, and sufficient oxygen must be supplied to complete the reaction.

It has been found that compounds containing the element niobium or columbium are effective, in conjunction with the cobaltous or cobaltic ions, in improving the yields of the desired products. The co-catalytic activity of niobium compounds is unexpected and could not have been predicted from existing knowledge since it was previously considered that only metals having a single valence state had any practical effect with cobalt in the absence of an initiator. The columbium compounds may be in the form of salts, oxides, hydroxides and complexes, and mixtures thereof, the only requirement being that sufficient amounts of the element be present to provide a catalytically active amount of ions in the solution during the course of the reaction. For example, the metal ions may be added in the form of compounds or complexes such as the oxalates, the acetylacetonates, the alcoholates, the chlorides, the octoates, acetylacetates and the like. Salts of the lower fatty acids are especially useful, e.g., the acetates, propionates, and butyrates. Potassium niobate is particularly effective. In practice, the metal should be present in amount of from 0.1 to 1.75 grams per liter. A preferred amount is from 0.2 to 1.0 gram per liter.

Suitable acid media for carrying out the reaction in the range set forth, as noted previously, are the monocarboxylic acids selected from the group consisting of aliphatic acids having 2 to 6 carbon atoms, mixtures thereof, and aryl aliphatic acids having from 8 to 12 carbon atoms, and mixtures thereof. Acetic acid is preferred, although such media as propionic, butyric, trimethyl acetic, phenyl acetic, and such hydroxy acids or derivatives as methoxy acetic, and the like, may be used.

Although not required, certain compounds, called "initiators," may be employed to aid in the attack on the hydrocarbon molecule, especially at lower temperatures. The preferred initiators are paraldehyde and methyl ethyl ketone; however, other similar aldehydes and ketones may be utilized. In general, aldehydes and ketones of 3 to 10 carbon atoms are suitable. The aldehydes acetaldehyde, propionaldehyde, tolualdehyde and isobutyraldehyde, and the ketones diethyl ketone, methyl propyl ketone, and 2,5-hexanedione are particularly effective. The initiator, when utilized, is present at the beginning of the reaction in an amount of from 0.1 to 0.5 mole per liter of solution. The initiator may also be added after the fashion described in U.S. application Ser. No. 617.803, to Barone, filed even date herewith, wherein the initiator, or the major portion thereof, is added during the period in the course of the reaction that the reaction experiences its maximum rate of oxidation or oxygen uptake.

Example I

An acetic acid solution containing 1.0 mole per liter p-xylene, 11.8 grams per liter cobaltous ion as cobalt acetate-tetrahydrate, and 0.47 gram per liter of columbium as columbium oxy-oxalate, was charged into a reactor provided with suitably valved gas inlet and outlet lines for admission of oxygen. The temperature of the reactor was held at 100° C. and the reaction carried out under atmospheric pressure. As a matter of convenience, the reaction was carried out for 24 hours, although it was clear that the bulk of the oxidation had been completed by ten to twelve hours of operation. The amount of p-xylene oxidized was 99.6 percent of that employed and gave a terephthalic acid yield of 69.8 percent.

Example II

The procedure of Example I was repeated utilizing 0.93 gram per liter of Nb ion as $NbCl_5$. Results showed 100 percent of the p-xylene was consumed to give yields of 67.3 percent p-toluic acid and 32.3 percent terephthalic acid respectively.

Example III

The procedure of Example I was repeated except that the reaction was carried out under a pressure of 500 p.s.i. Conversion of p-xylene was 100 percent for a yield of terephthalic acid of 84.2 percent.

Example IV

The procedure of Example I was repeated except that 0.24 gram per liter of niobium as the oxy-oxalate was utilized. The conversion of p-xylene was 100 percent for a terephthalic acid yield of 71.1 percent.

Example V

The procedure of Example I was repeated except that 0.93 gram per liter Nb as potassium niobate was used. The conversion of p-xylene was 100 percent for a terephthalic acid yield of 75.9 percent.

Example VI

The procedure of Example I was repeated except that 0.134 mole per liter of paraldehyde was added at the beginning of the reaction. The period of induction for the reaction was reduced, and the yield of terephthalic acid was increased to 86.8 percent.

While there are above disclosed but a limited number of embodiments of the process of the invention herein presented, it is possible to produce still other embodiments without departing from the inventive concept heretofore disclosed, and it is desired therefore that only such limitations be imposed on the appended claims as are stated therein, or required by the prior art.

I claim:

1. A process for oxidizing mono aryl compounds having at least one methyl or aldehyde group comprising contacting in an acid medium selected from the group consisting of aliphatic acids having 2 to 6 carbon atoms, mixtures thereof, and aryl aliphatic acids having 8 to 12 carbon atoms and mixtures thereof, 0.3 to 2 moles per liter of said mono aryl compound with oxygen, in the presence of from 0.3 to 24 grams per liter of a member selected from the group consisting of cobaltous ion, cobaltic ion, and mixtures thereof; and a catalytically active amount of niobium in solution, said contacting being carried out at a temperature of from 60° to 150° C. and a pressure of from 1 to 50 atmospheres.

2. The process of claim 1 wherein the member selected from the group consisting of cobaltous ion, cobaltic ion, and mixtures thereof, is present in an amount of from 0.4 to 8 gram atoms per liter, and the niobium is present in an amount of from about 0.1 gram per liter to about 1.75 grams per liter.

3. The process of claim 2 wherein the acid is an aliphatic acid having 2 to 6 carbon atoms.

4. The process of claim 3 wherein the temperature is from 70° to 100° C.

5. The process of claim 4 wherein the mono aryl compound is p-xylene.

6. The process of claim 5 wherein there is present 0.001 to 0.02 mole per liter of water.

7. A process for oxidizing mono aryl compounds having at least one methyl group comprising contacting in an aliphatic acid having 2 to 6 carbon atoms, and mixtures thereof, 0.3 to 2 moles per liter of said mono aryl compound with oxygen, in the presence of from 0.3 to 24 grams per liter of a member selected from the group consisting of cobaltous ion, cobaltic ion, and mixtures thereof; a catalytically active amount of niobium in solution, and an initiator comprising a ketone or an aldehyde, said contacting being carried out at a temperature of from 70° to 150° C. and a pressure of from 1 to 50 atmospheres.

8. The process of claim 7 wherein the member selected from the group consisting of cobaltous ion, cobaltic ion, and mixtures thereof, is present in an amount of from 0.4 to 8 grams per liter, and the niobium is present in solution in an amount of from about 0.1 gram per liter to about 1.75 grams per liter.

9. The process of claim 7 wherein the mono aryl compound is p-xylene.

10. The process of claim 7 wherin there is present 0.001 to 0.02 mole per liter of water.

11. The process of claim 7 wherein the initiator is selected from the group consisting of paraldehyde and methyl ethyl ketone and is present in an amount of from 0.1 to 0.5 mole per liter.

References Cited
UNITED STATES PATENTS

| 2,874,098 | 2/1959 | Appell | 260—524 |
| 3,171,856 | 3/1965 | Kurtz | 260—524 |

LORRAINE A. WEINBERGER, Primary Examiner

R. S. WEISSBERG, Assistant Examiner

U.S. Cl. X.R.

260—523